United States Patent
Da Rocha-Schmidt

(10) Patent No.: US 10,150,557 B2
(45) Date of Patent: Dec. 11, 2018

(54) SHAPE-VARIABLE GAP COVERING BETWEEN CONTROL SURFACES AND ADJACENT STRUCTURAL COMPONENTS ON AIRCRAFTS

(71) Applicant: Airbus Defence and Space GmbH, Ottobrunn (DE)

(72) Inventor: Luiz Da Rocha-Schmidt, München (DE)

(73) Assignee: Airbus Defence and Space GmbH (DE)

( * ) Notice: Subject to any disclaimer, the term of this patent is extended or adjusted under 35 U.S.C. 154(b) by 410 days.

(21) Appl. No.: 15/001,832

(22) Filed: Jan. 20, 2016

(65) Prior Publication Data
US 2016/0137286 A1    May 19, 2016

Related U.S. Application Data

(63) Continuation of application No. PCT/DE2014/000363, filed on Jul. 17, 2014.

(30) Foreign Application Priority Data

Jul. 20, 2013 (DE) .................. 10 2013 012 169

(51) Int. Cl.
*B64C 7/00* (2006.01)
*B64C 9/02* (2006.01)

(52) U.S. Cl.
CPC . *B64C 7/00* (2013.01); *B64C 9/02* (2013.01)

(58) Field of Classification Search
CPC .................................... B64C 7/00; B64C 9/02
See application file for complete search history.

(56) References Cited

U.S. PATENT DOCUMENTS

| 2,240,310 A | 4/1941 | McKay |
| 4,429,844 A | 2/1984 | Brown et al. |

(Continued)

FOREIGN PATENT DOCUMENTS

| DE | 91 13 090 U1 | 1/1992 |
| DE | 10 2010 011 750 A1 | 9/2011 |

(Continued)

OTHER PUBLICATIONS

International Search Report WO2015010676 (PCT/DE2014/000363) (dated Dec. 12, 2014).
German Office Action (dated Mar. 20, 2014).

*Primary Examiner* — Christopher P Ellis
(74) *Attorney, Agent, or Firm* — Lerner, David, Littenberg, Krumholz & Mentlik, LLP

(57) ABSTRACT

A transition piece, which can be mounted in a recess, and which can form a continuous surface from a structural component of an airplane to a control surface, which is connected to the structural component in a pivotable manner is described. The transition piece can be mounted between an edge of the structural component and a lateral edge of the control surface such that the transition piece is fastened in a pivotable manner both to the edge of the structural component and to the lateral edge of the control surface. According to an example, the transition piece has a planar design and can be deformed within said plane, that is, the transition piece can be stretched or compressed within this plane.

11 Claims, 4 Drawing Sheets

(56) References Cited

U.S. PATENT DOCUMENTS

| | | | | |
|---|---|---|---|---|
| 4,471,925 A * | 9/1984 | Kunz | ................... | B64C 9/00 244/130 |
| 5,222,699 A * | 6/1993 | Albach | ................... | B64C 3/48 244/213 |
| 5,794,893 A * | 8/1998 | Diller | ................... | B64C 3/48 244/130 |
| 5,810,291 A * | 9/1998 | Geiger | ................... | B64C 9/02 16/225 |
| 5,941,480 A * | 8/1999 | Wille | ................... | B64C 3/48 244/123.1 |
| 6,145,791 A * | 11/2000 | Diller | ................... | B64C 3/48 244/130 |
| 6,173,924 B1 * | 1/2001 | Young | ................... | B64C 3/48 244/215 |
| 6,209,824 B1 * | 4/2001 | Caton | ................... | B64C 7/00 244/213 |
| 8,695,925 B2 * | 4/2014 | Khorrami | ................... | B64C 9/02 244/212 |
| 8,763,958 B2 * | 7/2014 | Turner | ................... | B64C 7/00 244/203 |
| 9,174,723 B2 * | 11/2015 | Madsen | ................... | B64C 13/30 |
| 9,581,145 B2 * | 2/2017 | Jasklowski | ................... | F02K 1/1207 |
| 2002/0043590 A1 | 4/2002 | McCallum et al. | | |
| 2006/0118675 A1 | 6/2006 | Tidwell | | |
| 2011/0303796 A1 | 12/2011 | Etling | | |
| 2013/0062469 A1 | 3/2013 | Cengiz et al. | | |
| 2014/0048656 A1 | 2/2014 | Schlipf et al. | | |

FOREIGN PATENT DOCUMENTS

| | | |
|---|---|---|
| DE | 10 2011 018907 A1 | 10/2012 |
| EP | 1 857 359 A2 | 11/2007 |
| EP | 2 415 665 A2 | 2/2012 |
| GB | 472 567 A | 9/1937 |
| GB | 741 718 A | 12/1955 |

* cited by examiner

SHAPE-VARIABLE GAP COVERING BETWEEN CONTROL SURFACES AND ADJACENT STRUCTURAL COMPONENTS ON AIRCRAFTS

CROSS-REFERENCE TO RELATED APPLICATIONS

This application is a continuation of International Application No. PCT/DE2014/000363 filed Jul. 17, 2014, published on Jan. 29, 2015, which claims priority from German Patent Application No. 10 2013 012 169.8 filed Jul. 20, 2013, all of which are incorporated herein by reference.

FIELD OF THE INVENTION

The present invention relates to a device for bridging over gaps between movable and/or fixed structural components.

BACKGROUND OF THE INVENTION

Gaps form when conventional flaps/control surfaces are in the extended state. These permit the air to flow through, which reduces the efficiency of the flap and generates noise. The radar signature is a further issue, particularly in the military. Surface waves are emitted at gaps of this type. A conventional method for reducing this is clipping, i.e. rounding off sharp edges on the control surface.

A transition portion is known from US 2011/0303796 and forms a continuous contour across a gap. For this purpose, the transition portion comprises a plurality of ribs which can be pivotally fastened to a base part, wherein the transition is achieved by each of the adjacent ribs being substantially pivoted in a stepped manner until overall deflection is reached.

DE 91 13 090 U1 describes an option of closing a gap between a flap and a laterally adjacent fixed edge of a wing by means of a plate. In this regard, a triangular plate part can be provided, one side of which is articulated to the lateral edge of the flap, and the other side of which is held in a gap in the edge of the wing edge so as to be insertable and retractable and pivotable. In this case, at least one side has to allow for a change in length by displacement, which change is caused by a change in the angle between the flap and the wing edge.

BRIEF SUMMARY OF THE INVENTION

An aspect of the present invention may provide a shape-variable, yielding and flexible connection between movable and/or immovable structural components which, at the same time, has high rigidity against air loads.

Gaps for example on a wing of an aircraft can be covered in the span direction by means of a transition piece according to the invention, whereby, on the one hand, the flaps are made more effective and, on the other hand, surface waves are prevented from propagating, i.e. radars are prevented from being emitted.

In general, a transition piece according to an embodiment of the invention can be mounted in a recess and forms a continuous surface from a structural component of an aircraft to a control surface which is pivotally connected to the structural component. The transition piece can be mounted between an edge of the structural component and a lateral edge of the control surface in such a way that said transition piece is pivotally fastened to both the edge of the structural component and the lateral edge of the control surface.

According to one embodiment, the transition piece is planar and can be deformed in this plane, i.e. can be stretched/pulled apart or compressed/slid together.

According to one embodiment, the transition piece comprises a support structure having intersecting ribs. The intersecting ribs can be pivotally connected to one another. Furthermore, the ribs may have a profile which substantially matches the profile of the adjacent control surface and/or the profile of the adjacent structural component.

According to one embodiment, the ribs can each be oriented in parallel with the lateral edge of the control surface or in parallel with the edge of the structural component. In this manner, a pantographic mechanism can be formed by the ribs.

According to another embodiment, the transition piece comprises a shear-compliant outer skin. The shear-compliant outer skin may comprise a biaxially woven metal mesh. The shear-compliant outer skin may also comprise an elastomer layer.

According to one embodiment, the edge of the transition piece that is connected to the lateral edge of the control surface may form an angle of from 30° to 120° with the edge of the transition piece that is connected to the edge of the structural component. According to another embodiment, an angle of from 45° to 75° may be formed. According to another embodiment, an angle of 60° may be formed.

A transition piece according to an embodiment of the invention can be used in particular on an aircraft. Accordingly, an aircraft can comprise a structural component and a control surface which is pivotally fastened to the structural component, a recess being formed between a lateral edge of the control surface and an edge of the structural component, a transition piece according to the invention being provided for bridging over the recess.

According to another embodiment, the transition piece may be triangular.

In general, a transition piece according to an embodiment of the invention may comprise a combination of a support structure, for example in the form of a pantograph, and a shear-compliant outer skin, for example in the form of a woven metal mesh.

Covering gaps between two adjacent flaps and between flaps and adjoining structural components makes it possible, using this approach, to design aircraft that are aerodynamically more effective, produce less noise, and have a reduced radar signature. This means that the strategy is advantageous, inter alia, for use in the military. In this case, the increase in actuator forces when the flap is deflected is relatively low. This strategy can be used to form a completely continuous rear wing edge, including the control surfaces.

The aspects described above and further aspects, features and advantages of the invention may also be found in the example embodiments described below with reference to the appended drawings.

BRIEF DESCRIPTION OF THE DRAWINGS

In the following, embodiments of the invention will be described in more detail with reference to the accompanying drawings, in which.

In the figures, the same reference numerals are used for identical or at least similar elements, components or aspects. It is noted that the following describes in detail embodiments that are merely illustrative and non-restrictive.

DETAILED DESCRIPTION

Figure 1:
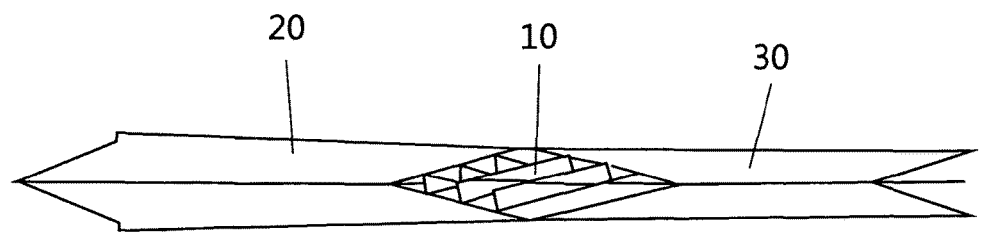
FIG. 1 is a front view of a support structure when the flap is not deflected.
Figure 2:
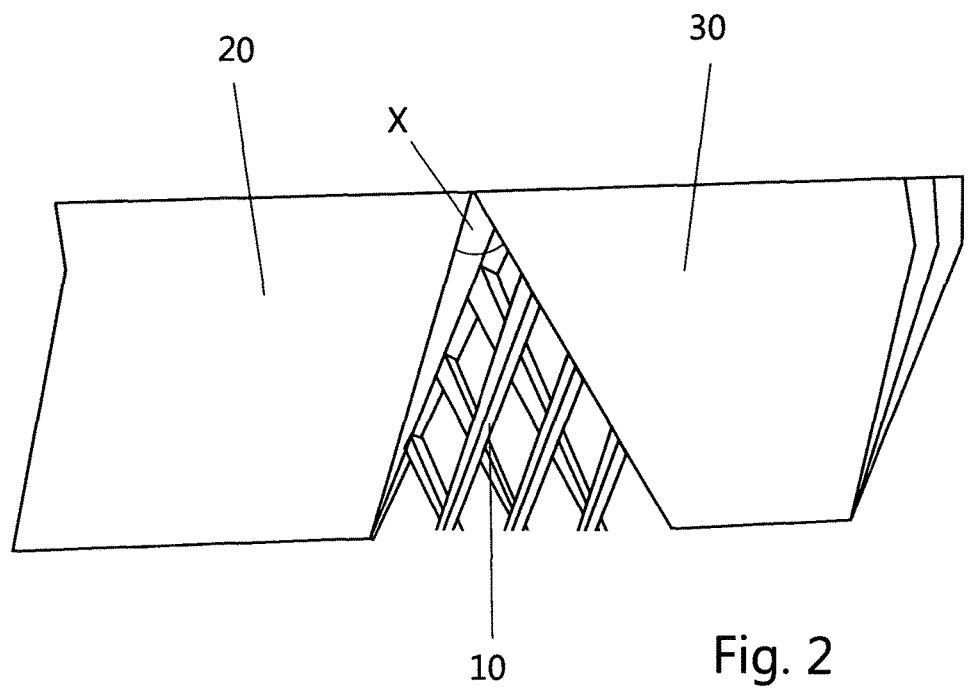
FIG. 2 is a plan view of a support structure when the flap is not deflected.

FIG. 1 and FIG. 2 show a transition piece 10 between a flap 20 and a structural component 30 which are arranged substantially in parallel with each other. FIG. 1 is a front view and FIG. 2 is a plan view of a rear edge of the structures. The flap 20 and the structural component 30 become thinner towards a rear edge. The support structure of the transition piece 10 comprises ribs which become comparatively thinner. It is noted that the edge denoted as the rear edge in this case may also be a front edge of a structure.

In the embodiment in FIG. 1 and FIG. 2, a recess is formed between the flap 20 and the structural component 30 at an angle X of approximately 60°. The ribs of the transition piece 10 are each arranged in parallel with an edge of the flap 20 or of the structural component 30, and are thus also arranged at an angle of approximately 60° to one another.

Figure 3:
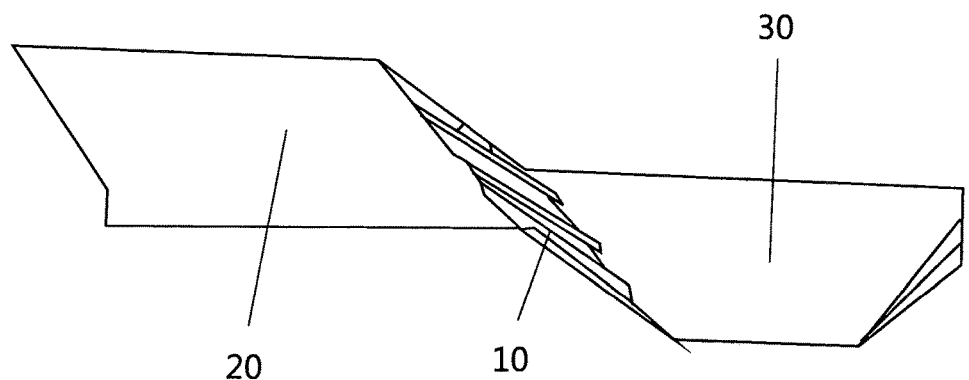
FIG. 3 is a front view of a support structure when the flap is deflected.
Figure 4:
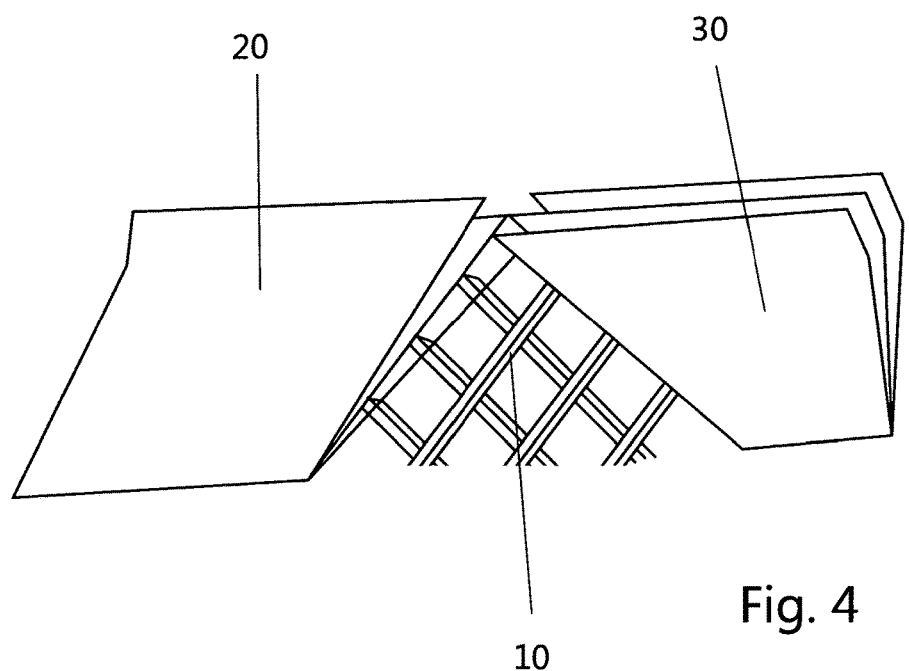
FIG. 4 is a plan view of a support structure when the flap is deflected.

FIG. 3 and FIG. 4 show a transition piece 10 between a flap 20 and a structural component 30, the flap 20 being pivoted relative to the structural component 30. For example, a flap can be deflectable by approximately 30° relative to an adjacent immovable structural component. In the event that two movable structures, for example flaps, are arranged adjacently to one another, said structures can be deflected by up to 60° relative to one another, for example one structure can be deflected by 30° upwards and the other by 30° downwards.

It can be seen in particular in FIG. 4 that the support structure of the transition piece 10 is pulled apart at an angle of approximately 90° or at an angle that is higher than the angle in the situation shown in FIG. 2.

Figure 5:
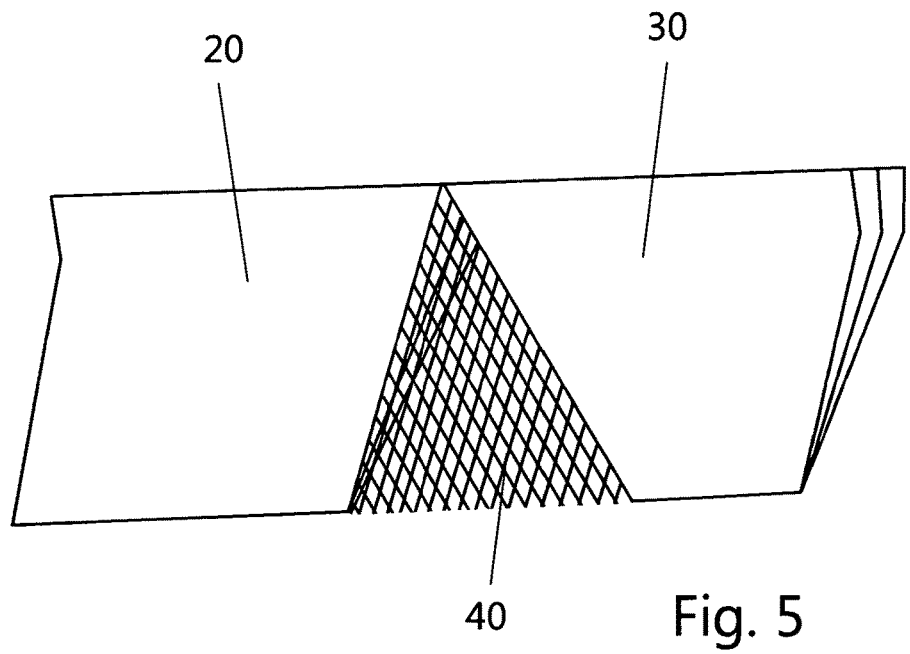
FIG. 5 is a plan view of an outer skin when the flap is not deflected.
Figure 6:
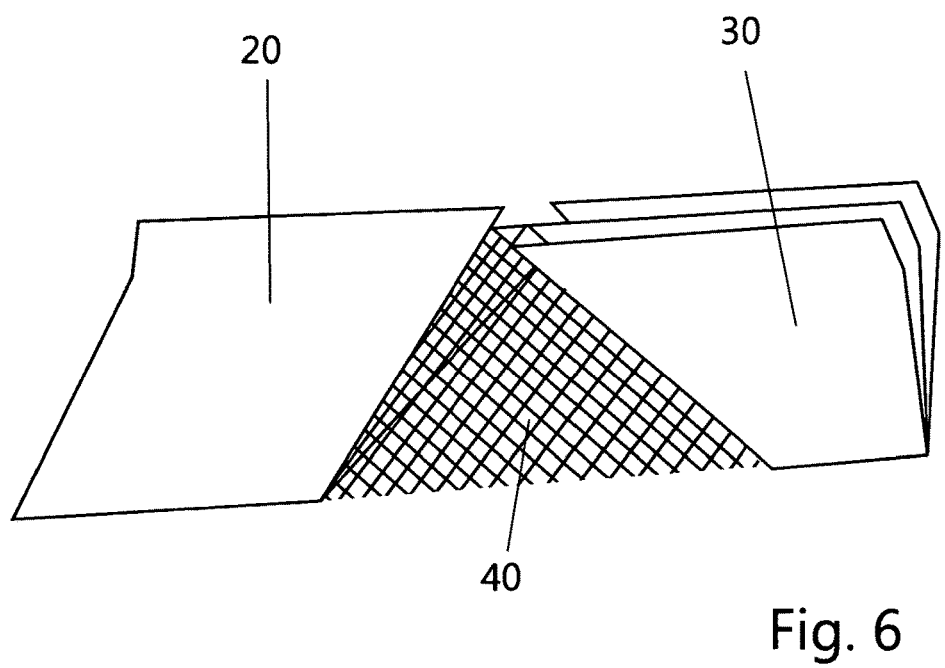
FIG. 6 is a plan view of an outer skin when the flap is deflected.

FIG. 5 and FIG. 6 show an outer skin 40 of a transition piece in the form of a woven metal mesh, the flap 20 in FIG. 5 being arranged substantially in parallel with the structural component 30, and the flap 20 in FIG. 6 being arranged so as to be deflected relative to the structural component 30. It can also be seen in these drawings that the individual wires of the metal weave are offset, and therefore an extended rear edge of the transition piece is permitted when the flap 20 is deflected. As is also the case with the support structure 10, the individual wires of the metal mesh are arranged substantially in parallel with one of the two edges of the flap and of the structural component. A transition region, for example made from a pure elastomer, can be provided between the outer skin and the adjoining flaps or structural components in order to compensate for relative displacements.

Figure 7:
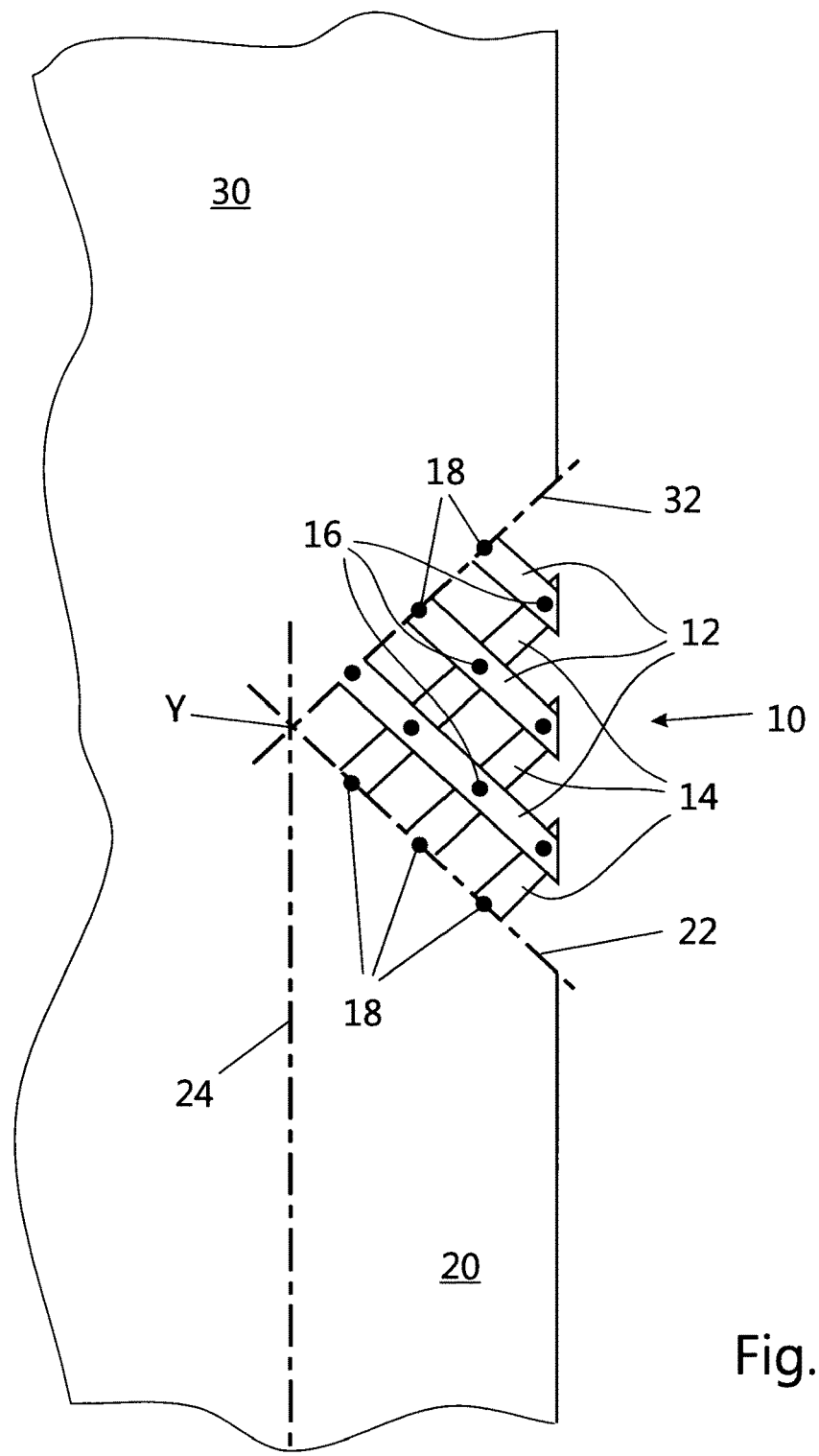
FIG. 7 is a detailed view of a support structure.

FIG. 7 is a detailed view of a transition piece which can be arranged between a flap 20 and a structural component 30. The support structure 10 of the transition piece comprises first ribs 12 arranged in parallel with a lateral edge 22 of the flap 20, and second ribs 14 arranged in parallel with the edge 32 of the structural component 30. The first ribs 12 are hingedly connected to the second ribs 14. Axial pins 16 may be provided between the first ribs 12 and the second ribs 14 in order to hingedly connect the ribs to one another.

Each of the first ribs 12 is hingedly connected, at the edge 32, to the structural component 30, and each of the second ribs 14 is hingedly connected, at the lateral edge 22, to the flap 20. The joints 18 by means of which the ribs are fastened to the flap or to the structural component are designed such that they make it possible for the rib to pivot about an axis which is perpendicular to the image plane in FIG. 7, whereby a pantographic movement, i.e. a shearing movement within the plane of the support structure, is made possible. Furthermore, joints 18 are designed so as to allow the rib to pivot about an axis which is located within the image plane in FIG. 7 and is represented by the dot-and-dash line through the points 18.

A dot-and-dash line 24 is also shown in FIG. 7. The line 24 is the axis about which the flap 20 can be pivoted relative to the structural component 30. It should be noted that the functioning of the transition piece is ensured in particular when the axes 22, 24 and 32 intersect at a point Y.

Since the joint lines between the flaps and the structure and the two joint lines of the support structure 10 intersect at point Y, pure shearing deformation occurs in the triangular transition plane. When aligned correctly, i.e. when the ribs are parallel to the edges, a support structure arranged in this way can also undergo this shearing deformation in a force-free manner. The skin material has to also undergo this deformation. For this, a composite of a biaxially woven metal mesh (as shown in FIG. 5 and FIG. 6), which may have a plurality of layers and can be deformed by shearing in a practically force-free manner, and a thin elastomer layer is advantageous. The metal mesh provides the electrical conductivity and a certain flexural rigidity. Furthermore, the elastomer can be made electrically conductive by filling materials. The elastomer layer provides a surface of the transition piece that is smooth and thus advantageous in terms of aerodynamics.

An elastomer composite acting as the skin material can be advantageous since said material is required to have high elastic elongation. At the same time, however, a certain rigidity is required in order to be able to absorb the aerodynamic forces. The required rigidity can be provided by means of the metal weave and the support structure.

The skin material can also be produced in a sandwich-structure, i.e. formed from a plurality of layers. In this regard, a core material that permits the same shearing deformation as the top layers but with less force may be inserted between each one of the layers or a plurality of layers of the elastomer composite at the top and bottom. For example, a square honeycomb core of which the honeycomb ribs can be oriented in parallel with the fibres in the metal mesh and with the intersecting ribs 12 and 14 of the support structure but are spaced further apart from one another than the fibres, is suitable for this purpose. A sandwich structure having one or more elastomer composite layers, one or more metal mesh layers and one or more honeycomb core layers can also be provided as the skin material or as the outer skin. In this way, the flexural rigidity of the skin material is increased, while the shear strength remains low.

While the invention has been illustrated and described in detail in the drawings and the above description, illustrations and descriptions of this type are intended to be merely illustrative or exemplary and not restrictive, and therefore the invention is not limited by the disclosed embodiments. In the claims, the word "comprising" does not exclude other elements and the indefinite article "a" or "an" does not exclude a plurality.

The mere fact that particular features are specified in different dependent claims does not limit the subject matter of the invention. Combinations of these features may also be advantageously used. The reference numerals in the claims are not intended to restrict the scope of the claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Support structure
12 First rib
14 Second rib
16 Axial pin
18 Joint
20 Control surface/Flap
22 Lateral edge of the control surface
24 Pivot axis of the control surface
30 Structural component
32 Edge of the structural component
40 Woven metal mesh

The invention claimed is:

1. A transition piece for forming a continuous surface from a structural component of an aircraft to a control surface, wherein the control surface has a front edge, a rear edge and two lateral edges, wherein the front edge or the rear edge of the control surface is pivotally connected to the structural component,
   wherein the transition piece is configured to be mounted in a recess formed between an edge of the structural component and one of the lateral edges of the control surface,
   wherein the transition piece is configured to be pivotally mounted on the edge of the structural component and to be pivotally mounted on the lateral edge of the control surface, and
   wherein the transition piece is planar flat and extends in a plane and is configured to be deformed within the plane.

2. A transition piece for forming a continuous surface from a structural component of an aircraft to a control surface, wherein the control surface has a front edge, a rear edge and two lateral edges, wherein the front edge or the rear edge of the control surface is pivotally connected to the structural component,
   wherein the transition piece is configured to be mounted in a recess formed between an edge of the structural component and one of the lateral edges of the control surface,
   wherein the transition piece is configured to be pivotally mounted on the edge of the structural component and to be pivotally mounted on the lateral edge of the control surface,
   wherein the transition piece is planar and is configured to be stretched or pulled apart within a plane, and
   wherein the transition piece comprises a support structure including intersecting ribs.

3. The transition piece according to claim 1, wherein the intersecting ribs are pivotally connected to one another.

4. The transition piece according to claim 1, wherein the ribs have a profile substantially matching at least one of the profile of the adjacent control surface and the profile of the adjacent structural component.

5. The transition piece according to claim 1, wherein the ribs are each oriented in parallel with the lateral edge of the control surface or in parallel with the edge of the structural component.

6. The transition piece according to claim 1, wherein the transition piece comprises a shear-compliant outer skin.

7. The transition piece according to claim 6, wherein the shear-compliant outer skin comprises a biaxially woven metal mesh.

8. The transition piece according to claim 6, wherein the shear-compliant outer skin comprises an elastomer layer.

9. The transition piece according to claim 6, wherein the shear-compliant outer skin is formed from a plurality of different layers.

10. The transition piece according to claim 1, wherein the edge of the transition piece that is connected to the lateral edge of the control surface forms an angle of from 30° to 120° with the edge of the transition piece that is connected to the edge of the structural component.

11. An aircraft comprising:
   a structural component;
   a control surface pivotally fastened to the structural component,
   wherein a recess is formed between a lateral edge of the control surface and an edge of the structural component,
   said aircraft further comprising a transition piece for bridging over the recess,
   wherein the transition piece is configured to be mounted in a recess formed between an edge of the structural component and one of the lateral edges of the control surface,
   wherein the transition piece is configured to be pivotally mounted on the edge of the structural component and to be pivotally mounted on the lateral edge of the control surface, and
   wherein the transition piece is planar and is configured to be deformed within a plane,
   wherein the transition piece comprises a support structure including intersecting ribs.

* * * * *